United States Patent
Chang

(10) Patent No.: US 6,314,430 B1
(45) Date of Patent: Nov. 6, 2001

(54) SYSTEM AND METHOD FOR ACCESSING A DATABASE FROM A TASK WRITTEN IN AN OBJECT-ORIENTED PROGRAMMING LANGUAGE

(75) Inventor: Sandra Sheu Chang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,493

(22) Filed: Feb. 23, 1999

(51) Int. Cl.[7] .......................... G06F 17/30; G06F 15/163
(52) U.S. Cl. .................... 707/103; 707/10; 707/102; 709/203; 709/219; 709/237; 709/309
(58) Field of Search ................ 707/103, 4, 102, 707/10; 709/203, 219, 237, 302

(56) References Cited

U.S. PATENT DOCUMENTS

| | | | |
|---|---|---|---|
| 5,555,367 | * 9/1996 | Premerlani et al. ...................... | 707/4 |
| 5,596,745 | * 1/1997 | Lai et al. .............................. | 707/103 |
| 5,696,961 | * 12/1997 | Briscoe et al. ........................... | 707/2 |
| 5,701,461 | 12/1997 | Dalal et al. ............................. | 707/4 |
| 5,706,434 | 1/1998 | Kremen et al. .................. | 395/200.09 |
| 5,708,709 | 1/1998 | Rose ......................................... | 380/4 |
| 5,718,247 | 2/1998 | Frankel ................................. | 128/898 |
| 5,727,950 | 3/1998 | Cook et al. .......................... | 434/350 |
| 5,734,835 | 3/1998 | Selker ............................. | 395/200.79 |
| 6,006,224 | * 12/1999 | McComb et al. ....................... | 707/5 |
| 6,085,198 | * 7/2000 | Skinner et al. ...................... | 707/103 |
| 6,173,439 | * 1/2001 | Carlson et al. .......................... | 717/1 |
| 6,233,590 | * 5/2001 | Shaw et al. .......................... | 707/500 |

* cited by examiner

*Primary Examiner*—Jean R. Homere
(74) *Attorney, Agent, or Firm*—Ohlandt, Greeley, Ruggiero & Perle, LLP; Noreen A. Krall, Esq.

(57) ABSTRACT

In a computer-implemented process, a task requiring access to a database uses an object-oriented class to enable one database connection for the duration of the task, avoiding multiple and concurrent database connections, thus allowing a more efficient use of the database connection.

18 Claims, 7 Drawing Sheets

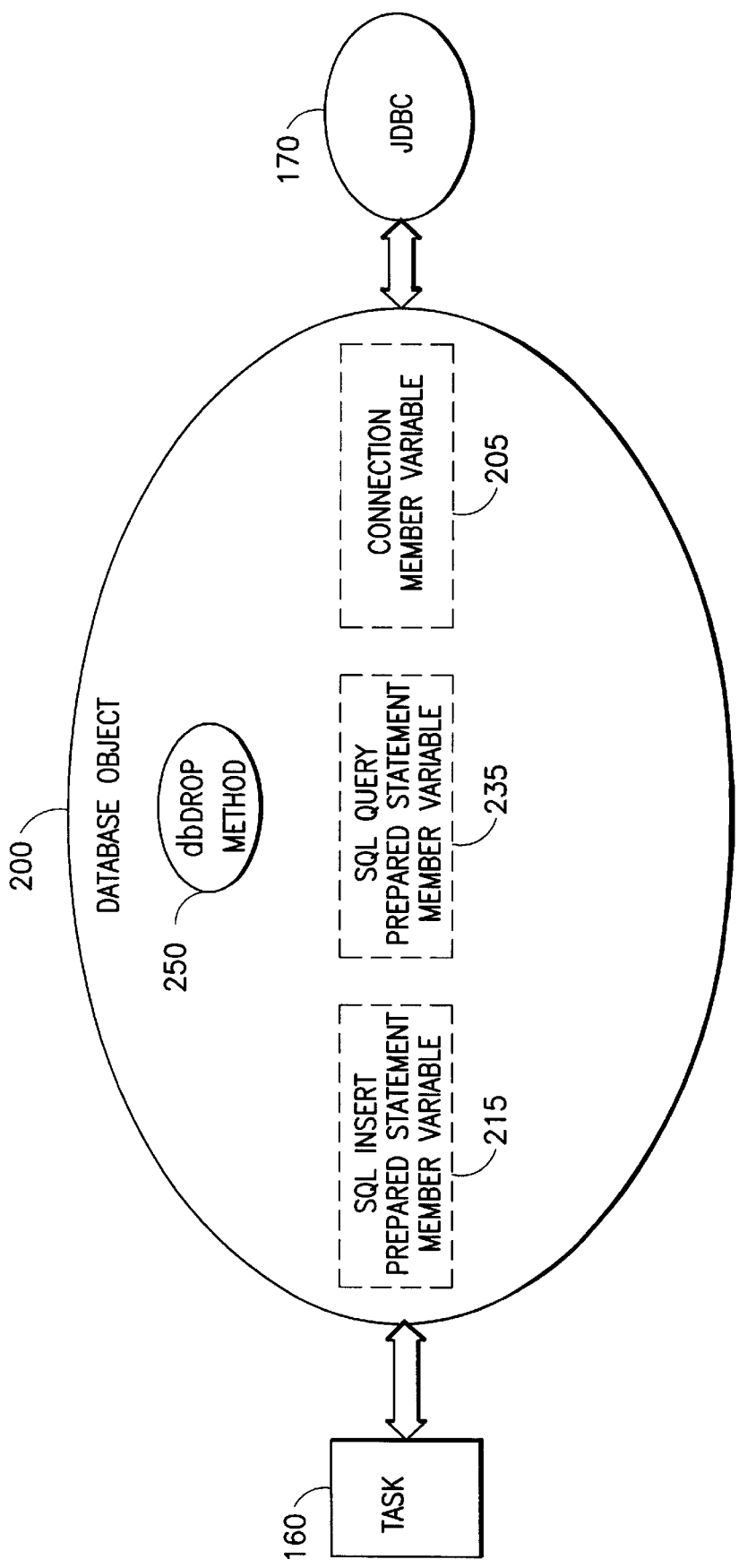

SYSTEM AND METHOD FOR ACCESSING A DATABASE FROM A TASK WRITTEN IN AN OBJECT-ORIENTED PROGRAMMING LANGUAGE

FIELD OF THE INVENTION

This invention relates to a technique for accessing a database from a task written in an object-oriented programming language, and more particularly, for accessing the database through the application of a class of objects, written in Java™, and employing a JDBC™ Application Program Interface.

BACKGROUND OF THE INVENTION

A database is an organized collection of data that can be readily searched, sorted and updated. The database is often logically arranged as tables identified by table names, with columns identified by column names. Access to the database is typically managed by a software interface known as a database management system (DBMS)

In a distributed computing environment, an application running on a first computer may require access to a database residing on a second computer. The computers each include some form of memory and a processor for the storage and execution of instructions, but they are also interconnected through communications equipment to collectively form a computer network so that they may share information.

A three-tier model for database access is a common computer network architecture. As the name implies, the three-tier model includes three layers of processing, namely (1) a client machine, (2) a server machine and (3) a database server. A person, using a client application program that needs to access a database, will be operating the client machine. For example, the client application may be an Internet browser and the database may be a directory of an Internet search engine. The client machine communicates a request to the server machine. The request typically includes a uniform resource locator (URL) that identifies the server machine, the communications protocol, and the desired resource. The server machine determines the location of the database and establishes a connection to the database server, to include any handshaking necessary to secure the connection. Thereafter, the server machine relays the request to the database server. The request is managed by a DBMS also located on the database server. The requested data is transmitted from the database server to the server machine, and it is thereafter relayed to the client machine where it is used by the client application program.

Structured query language (SQL) is a standard protocol for accessing databases. SQL can be used to formulate a database interface statement for subsequently executing a database transaction. SQL includes features that allow users to query, update, insert data into, and delete data from, a database. Requests to a DBMS are made in the form of an SQL transaction.

Java™ is an object-oriented programming language developed by Sun Microsystems, Inc. The developers of Java™ intended it to be a platform-neutral language. That is, they intended for Java™ programs to be developed on any first computer, and then executed on any second computer, independent of the operating systems controlling either of the computers.

Java™ programs can be written as stand-alone applications or as applets. An applet is a Java™ program, embedded within an Internet web page, and designed to run on a Java™-enabled Internet browser.

As an object-oriented programming language, Java™ includes the constructs of class, object, member variables and methods. A class is a template for defining the characteristics of a specific set of data structures and routines. The variables and routines defined by the class are respectively known as member variables and methods. When a program wishes to use those specific data structures and routines, the program instantiates the class, thus creating an object of the class. Additionally, Java™ includes a vector class that handles arrays of variable size for which memory can be allocated as the need arises.

In the case where a Java™ program requires access to a database, the program can employ the JDBC™ Application Program Interface (JDBC™ API) and its associated JDBC™ drivers. "JDBC" may have, at one time, been an acronym for Java™ Database Connectivity, but it is now a trademark of Sun Microsystems, Inc. Through JDBC™, programs written in Java™ may access many popular databases using standard SQL protocol. More specifically, a Java- program can use JDBC™ to establish a connection with a database, send SQL statements to the database, process a result from the database and return a result to the Java™ program.

JDBC™ includes the capability of representing a PreparedStatement object. A PreparedStatement is an object used for SQL statements that take one or more parameters as input arguments. It is pre-compiled and stored for future, repetitive use.

FIG. 1 illustrates a technique used in the prior art to access a database from a client application in a network organized as a three-tier model. The system includes client machine 10, server machine 50 and database server 20. Assume client application 12 desires access to database 24. Client machine 10 communicates its request to server machine 50, wherein task 60 is created. Task 60 invokes internal subtasks 62, which individually formulate SQL statements and reformat the SQL statements according to JDBC™ protocol. JDBC™ 70 is comprised of JDBC™ API 72 and JDBC™ driver 74. Each of subtasks 62 individually interface with JDBC™ 70 via JDBC™ API 72. In turn, for each subtask 62, JDBC™ driver 74 establishes a connection to database 24 via DBMS 22. When JDBC™ 70 receives a result from database 24, it processes and relays the result to the appropriate subtask 62. Thereafter, each subtask 62 closes its individual database connection.

The prior art suffers several drawbacks. Typically, each of the various subtasks 62 will support different types of database accesses such as query only, insert only, query and update, or query and delete. Some of subtasks 62 may require a single database access while others may require multiple accesses. An individual subtask 62 opens and closes database connections without regard to other subtasks 62 that may be accessing the database at the same time. Consequently, task 60 may have several database connections open concurrently. This is inefficient and may degrade performance of the application as a whole. In addition, since each of subtasks 62 independently interface with JDBC™ 70, the interfaces are redundant. This redundancy can lead to an increase in the number of defects and increased maintenance costs if the JDBC™ interface changes.

Accordingly, a first object of the present invention is to provide an object-oriented class that can be instantiated by a task to establish and retain a single database connection until the task is completed, thus avoiding multiple and concurrent connections to the database.

A second object of the present invention is to provide an object-oriented class bundling all database functions such as connect, query, update, and delete, and further defining methods by which a task can easily and efficiently interface with an application program interface to access a database, wherein a programmer developing the task need not be familiar with either SQL or the details of the application program interface.

A third object of the present invention is to provide an object-oriented class defining methods where database queries are constructed in advance, such as with JDBC™ PreparedStatement objects, and then employed to expedite repetitive SQL transactions.

SUMMARY OF THE INVENTION

In a computer-implemented process, a task requiring access to a database uses an object-oriented class to enable one database connection for the duration of the task, avoiding multiple and concurrent database connections, thus allowing a more efficient use of the database connection.

The present invention can be implemented on a computer network configured as a three-tier model, which includes a client machine, a server machine and a database server. The server machine includes a JDBC™ Application Program Interface and a JDBC™ driver. Additionally, the server machine includes an embodiment of the present invention, that is, a class ("Database class") that defines all of the methods necessary to interface between a task and JDBC™, and bundles all of the database functions such as connect, query, update and delete.

In the case where an application executing a program on the client machine requires access to a database on the database server, the client machine communicates a request to the server machine. The server machine creates a task that instantiates the Database class to create a Database object. The Database object establishes a single connection to the database and retains parameters that will allow for subsequent use of the database connection for the duration of the task. Multiple and concurrent connections to the database are thus avoided.

Subsequently, the task can invoke Database object methods to format SQL statements and execute SQL transactions with the database via JDBC™. The Database object encapsulates the interface with JDBC™ and relieves the task, and the programmer of the task, of the burden of formatting the SQL statements. The exchange of parameters between the task and the Database object can be in the form of vectors to accommodate a variable number of arguments.

The methods defined by the Database class are designed to take advantage of JDBC™ PreparedStatement objects. Specifically, a first method can prepare an SQL Transaction in the form of a PreparedStatemen and a second method can subsequently use the PreparedStatement to expedite access to the database. The PreparedStatement can be used repetitively.

BRIEF DESCRIPTION OF THE DRAWINGS

FIG. 7 is a block diagram illustrating the exchanges of parameters between a task, a Database object and a JDBC™ API for the case where the task wishes to drop a connection to a database.

DETAILED DESCRIPTION OF THE INVENTION

Figure 1:
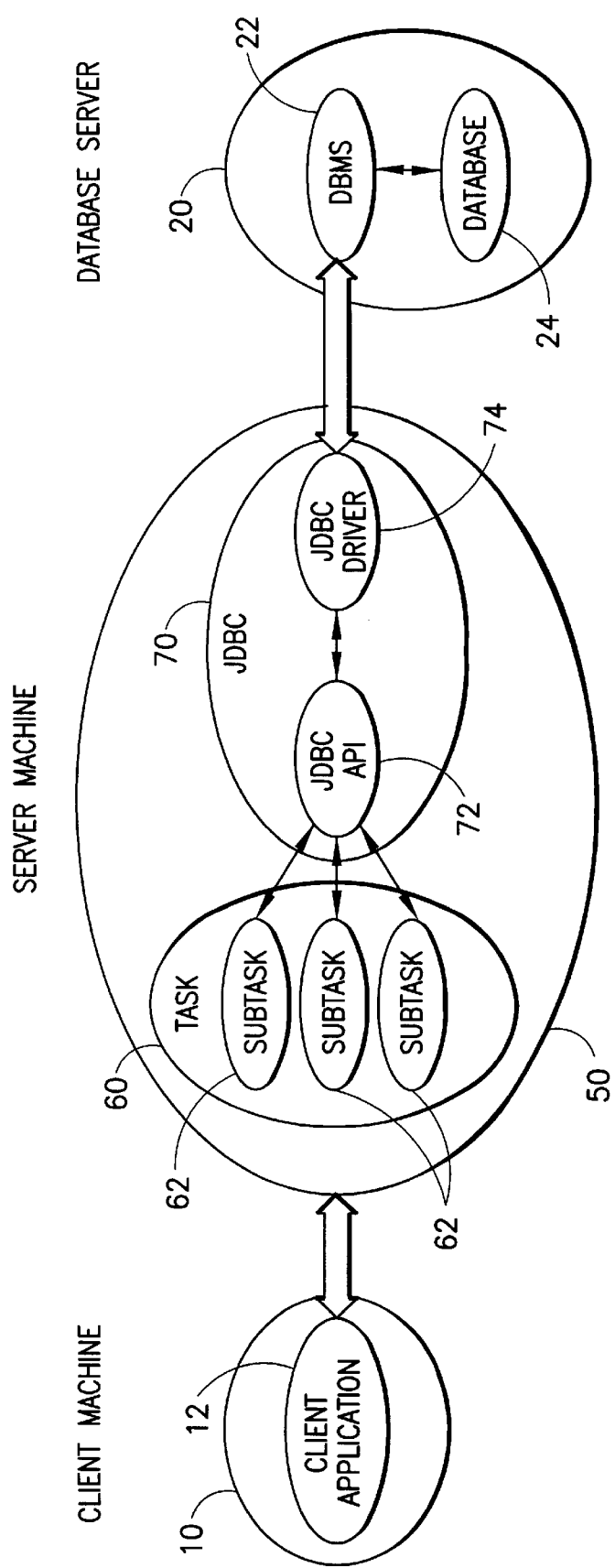
FIG. 1 is a block diagram of a prior art computer network configured as a three-tier model.
Figure 2:
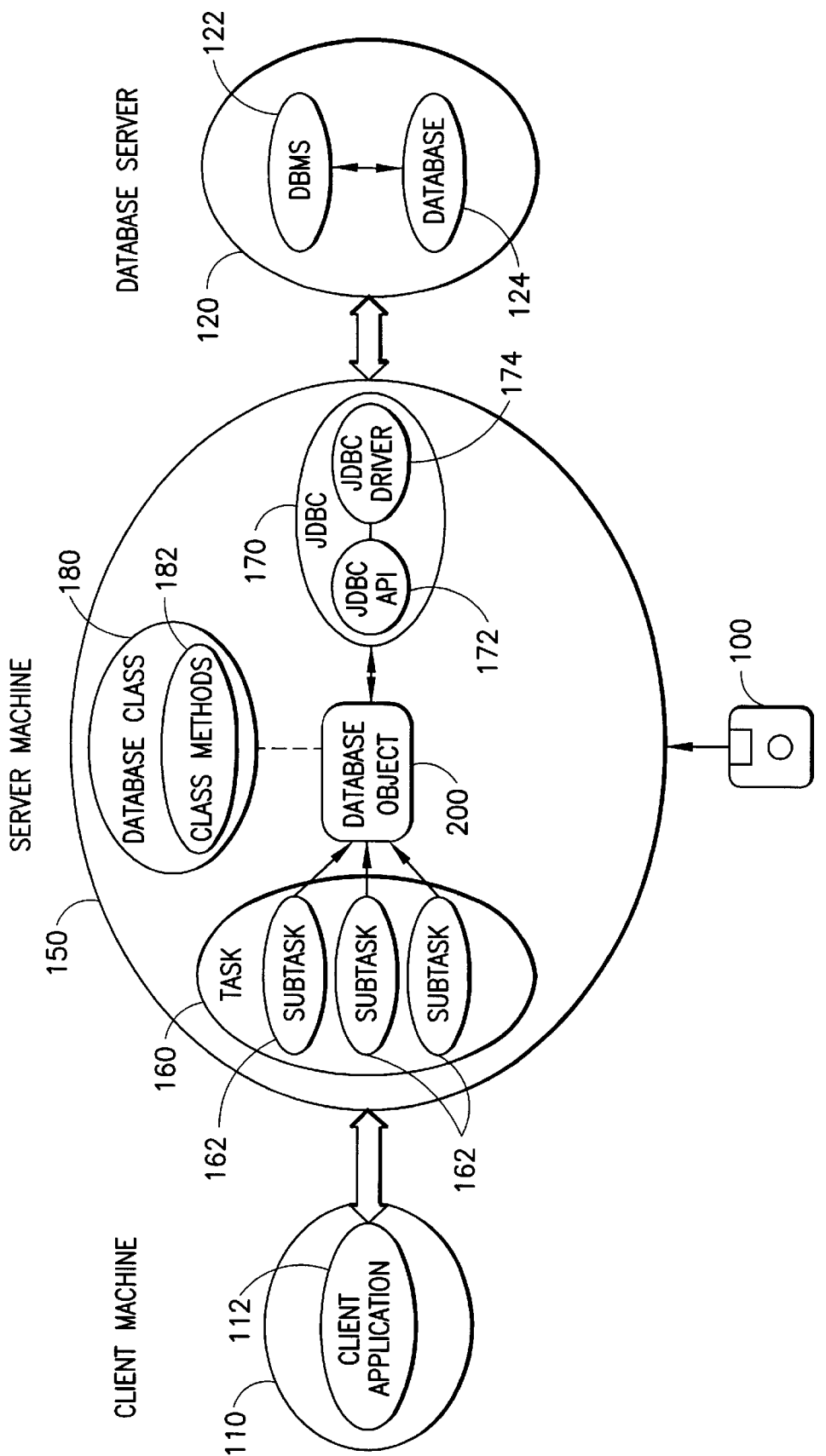
FIG. 2 is a block diagram of a computer network configured as a three-tier model, particularly adapted to carry out the present invention.

FIG. 2 illustrates a three-tier model for database access particularly adapted to carry out the present invention. The three major components of this model are client machine 110, server machine 150 and database server 120.

Database server 120 includes a database 124 under management of DBMS 122. Server machine 150, serves as an interface between client machine 110 and database server 120.

Server machine 150 includes JDBC™ for passing SQL statements to DBMS 122. Server machine 150 also includes the present invention, Database class 180, which defines a plurality of Database class methods 182. When Database class 180 is instantiated, Database object 200 is created and thereafter provides an interface for accessing database 124.

Client machine 110 is running a client application 112 that desires access to database 124. To achieve this objective, client machine 110 communicates a request to server machine 150. In response, server machine 150 creates task 160, which instantiates Database class 180 to create Database object 200. Thereafter, task 160, and its subtasks 162, can interface with database 124 via Database object 200.

JDBC™ 170 is comprised of a JDBC™ API 172 and a JDBC™ driver 174. Database object 200 will typically format a SQL statement according to the specification of JDBC™ API 172. In the case of a complicated SQL statement for a one-time request, Database object 200 can accommodate a SQL "where" clause to be constructed by task 160.

Figure 3:
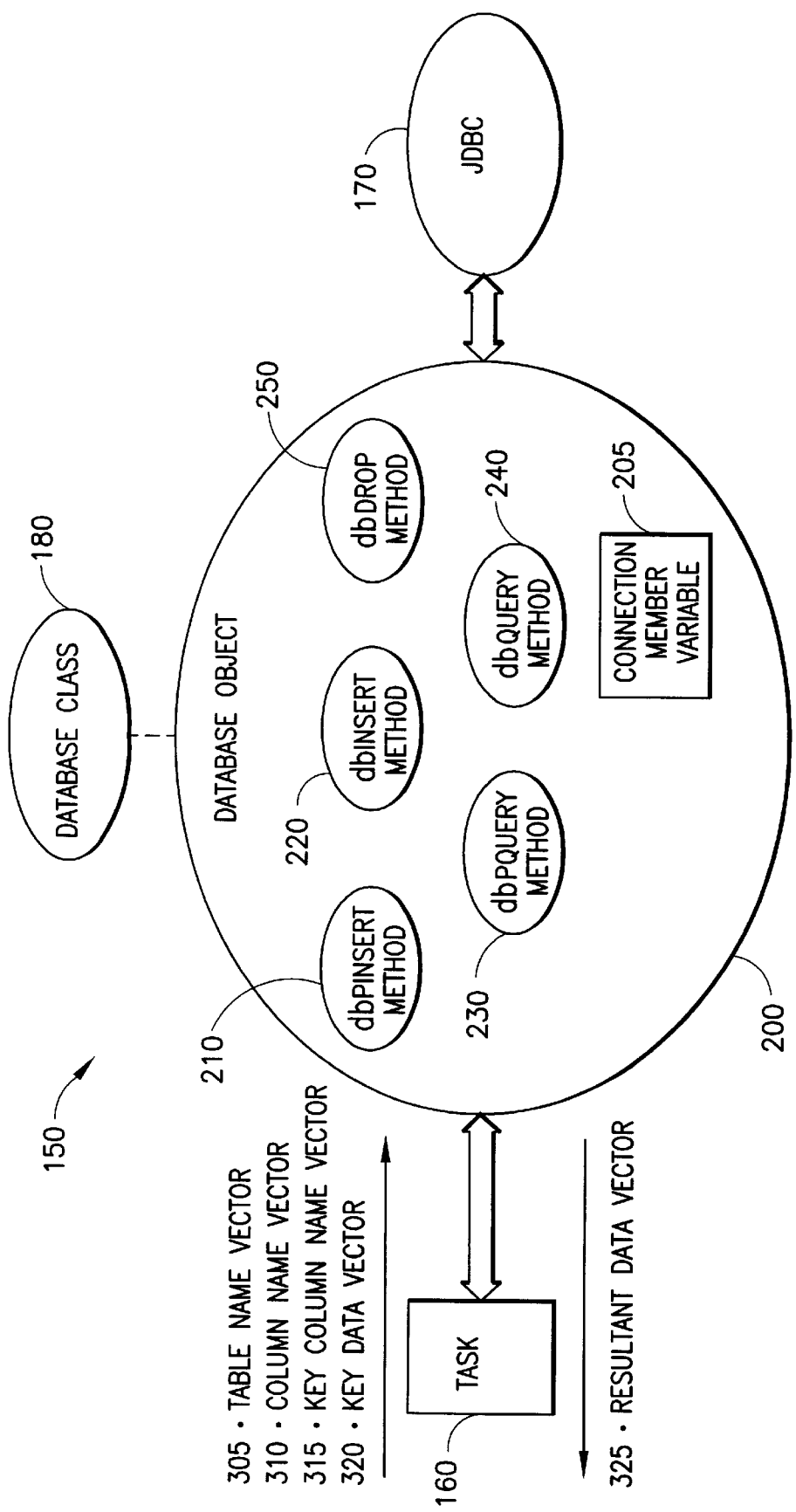
FIG. 3 is a block diagram of a server machine with a more detailed representation of a Database object.

FIG. 3 shows server machine 150 with a more detailed representation of Database object 200 as it provides an interface between task 160 and JDBC™ 170. Upon creation, Database object 200 establishes a connection to database 124 via JDBC™ 170, and saves, as connection member variable 205, a connection handle which permits subsequent use of the database connection. Task 160 utilizes Database object 200 by exchanging parameters in the form of vectors and invoking Database object methods. This illustration includes table name vector 305, column name vector 310, key column name vector 315, key data vector 320, and resultant data vector 325, and some exemplary Database object methods, namely, the dbPInsert method 210, dbPInsert method 220, dbPQuery method 230, dbQuery method 240 and dbDrop method 250. These vectors and object methods are described below.

Figure 4:
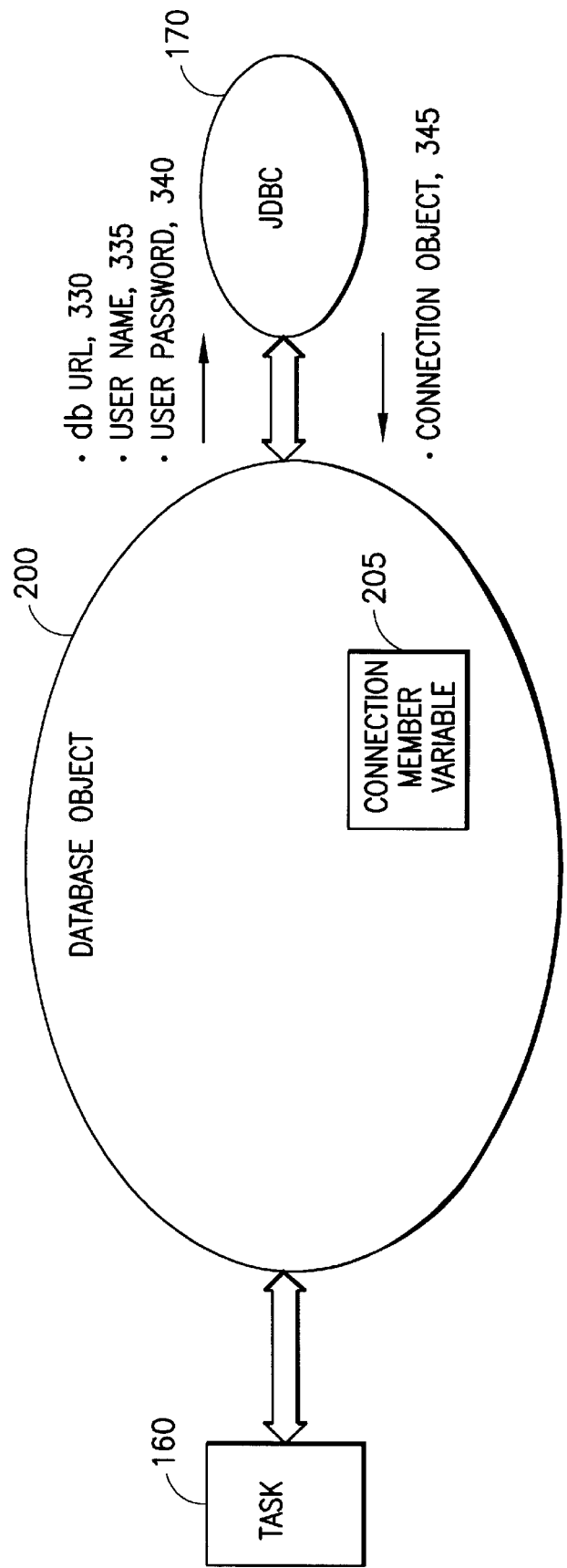
FIG. 4 is a block diagram illustrating the exchange of parameters between a Database object and a JDBC™ API when initially establishing a connection to a database.

FIG. 4 illustrates the exchange of parameters between Database object 200 and JDBC™ 170 when initially establishing a connection to database 124. Database object 200 passes to JDBC™ 170 a database URL 330, a user name 335 and a user password 340. JDBC™ 170 establishes the database connection and returns to Database object 200 a connection object 345. Connection object 345 provides a connection handle to allow for subsequent use of the database connection. Database object 200 saves the connection object 345 as connection member variable 205. When Database object 200 needs to subsequently use the database connection, Database object 200 can readily recall connection member variable 205. Note that JDBC™ 170 handles all of the interface with database server 120 thus relieving Database object 200 of this burden, and Database object 200 relieves task 160 of the burden of interfacing with JDBC™ 170.

Figure 5:
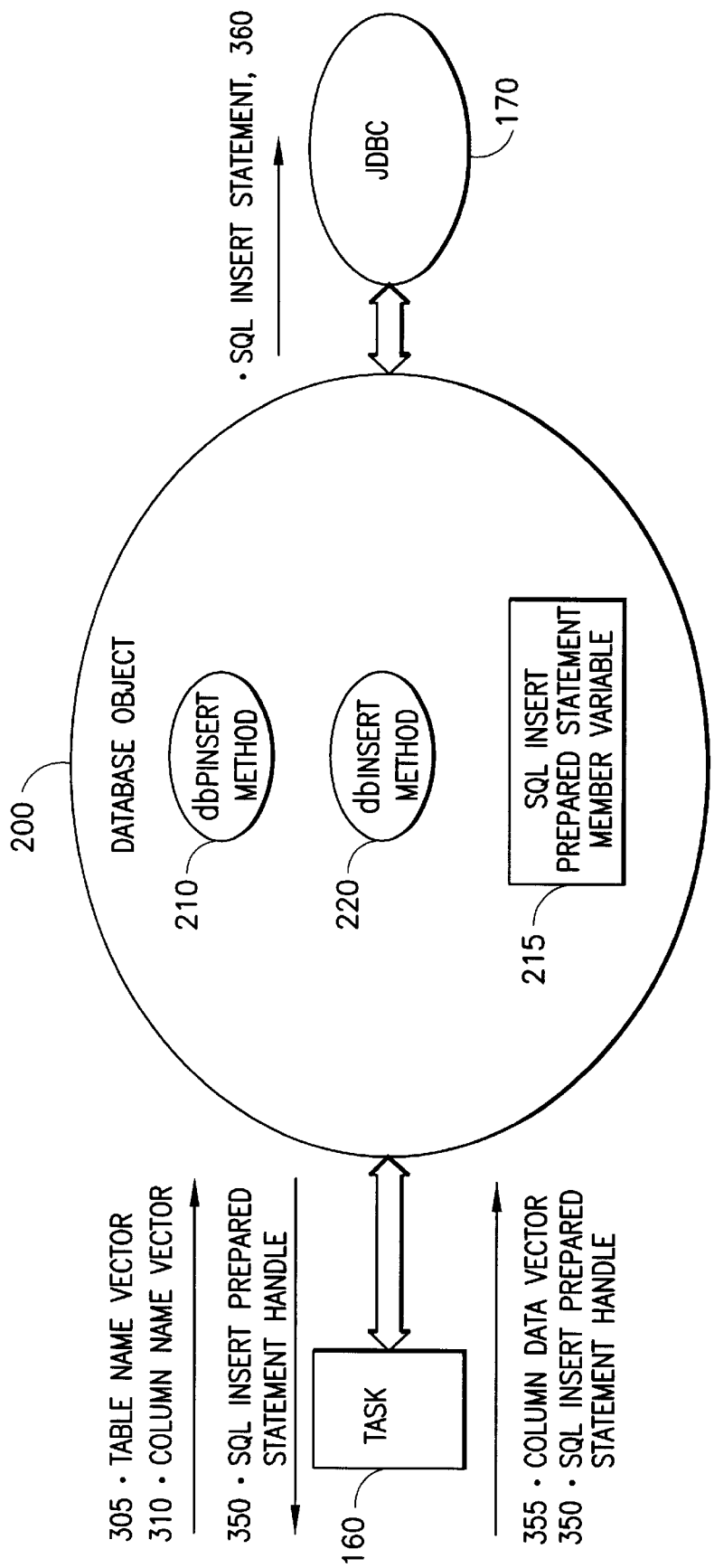
FIG. 5 is a block diagram illustrating the exchanges of parameters between a task, a Database object and a JDBC™ API for the case where the task wishes to insert data into a database.

FIG. 5 illustrates the exchanges of parameters between task 160, Database object 200 and JDBC™ 170 for the case where task 160 wishes to insert data into database 124. Task 160 invokes dbPInsert method 210 and passes to it a table name vector 305 and a column name vector 310. The dbPInsert method 210 formulates an SQL Insert PreparedStatement, saves it as SQL Insert PreparedStatement member variable 215, and returns to task 160 an SQL Insert PreparedStatement handle 350.

Subsequently, task 160 invokes the dbPInsert method 220 and passes to it a column data vector 355 and, from earlier, the SQL Insert PreparedStatement handle 350. The dbPInsert method 220 recalls SQL Insert PreparedStatement member variable 215 and uses it and the data identified by column data vector 355 to format SQL insert statement 360. The dbPInsert method 220 then passes to JDBC™ 170 the SQL insert statement 360.

From this point, JDBC™ 170 handles the Interface to database server 120 for the insertion of the subject data into database 124. Database object 200 thus relieves task 160 of the burdens of formatting SQL insert statements and of interfacing to JDBC™ 170.

Database object 200 can use SQL Insert. PreparedStatement member variable 215 repetitively for the insertion of data into database 124. That is, in the case where task 160 wishes to make multiple insertions of data into database 124, task 160 can repetitively invoke dbPInsert method 220, which can repetitively recall SQL Insert PreparedStatement member variable 215 to streamline the operation. Thereby, the inefficiency of redundantly formatting an individual SQL insert statement for the insertion of each individual data item is drastically reduced.

Figure 6:
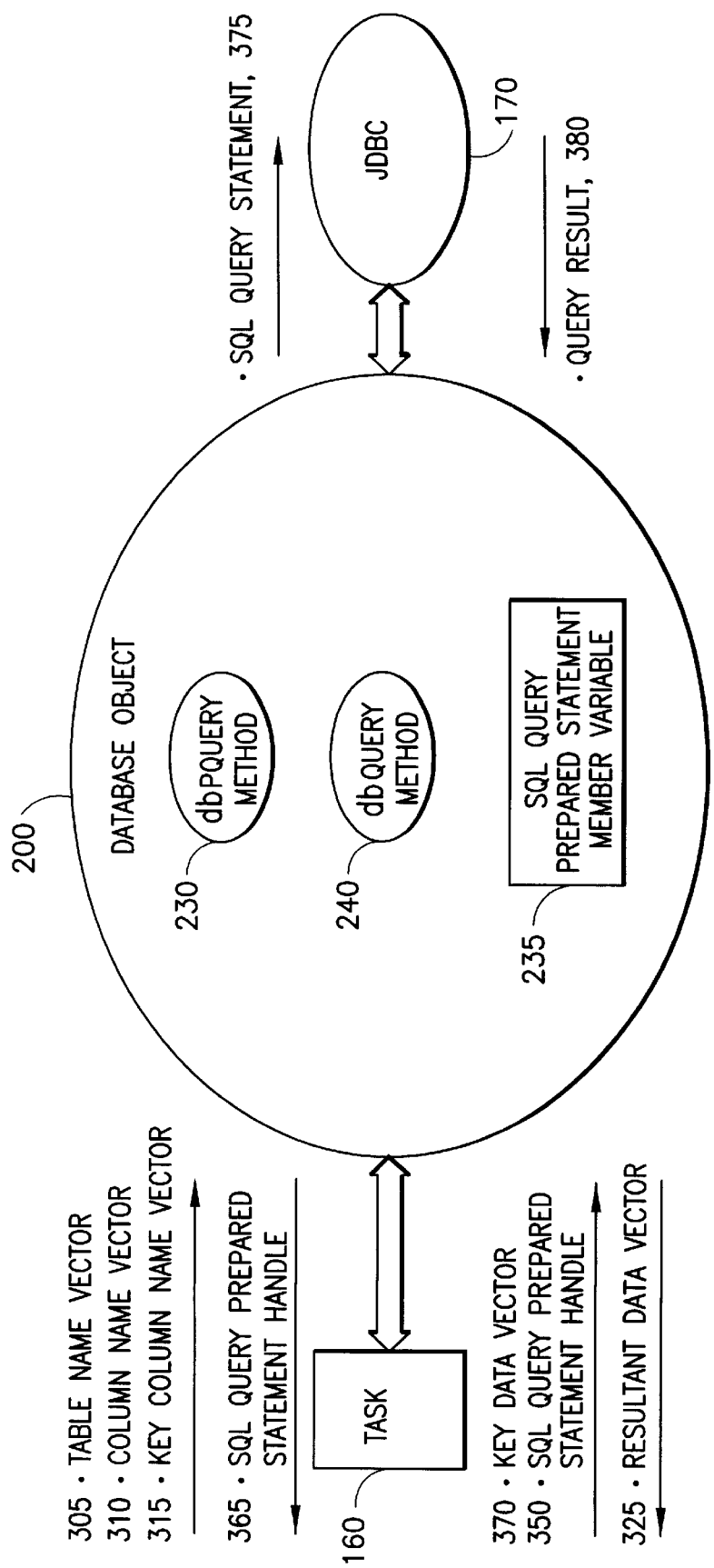
FIG. 6 is a block diagram illustrating the exchange of parameters between a task, a Database object and a JDBC™ API for the case where the task wishes to query a database

FIG. 6 illustrates the exchange of parameters between task 160, Database object 200 and JDBC™ 170 for the case where task 160 wishes to query database 124. Task 160 invokes dbPQuery method 230 and passes to it table name vector 305, column name vector 310 and key column name vector 315. The dbPQuery method 230 formulates an SQL Query PreparedStatement, saves it as SQL Query PreparedStatement member variable 235, and returns to task 160 an SQL Query PreparedStatement handle 365.

Subsequently, task 160 invokes the dbQuery method 240 and passes to it a key data vector 370 and, from earlier, the SQL Query PreparedStatement handle 365. The dbQuery method 240 recalls SQL Query Prepared Statement member variable 235 and uses it and the data identified by key data vector 370 to format SQL query statement 375. The dbQuery method 240 then passes to JDBC™ 170 the SQL query statement 375.

From this point, JDBC™ 170 handles the interface to database server 120 for the query of database 124. JDBC™ 170 returns to Database object 200 a query result 380, which Database object 200 processes, and thereafter returns to task 160 a resultant data vector 325. Database object 200 thus relieves task 160 of the burdens of formatting SQL query statements and of interfacing to JDBC™ 170.

Database object 200 can use SQL Query PreparedStatement member variable 235 repetitively to query database 124. That is, in the case where task 60 wishes to make multiple queries of database 124, task 160 can repetitively invoke dbQuery method 240 which can repetitively recall SQL Query PreparedStatement member variable 235 to streamline the operation. Thereby, the inefficiency of redundantly formatting an individual SQL query statement each individual query of the database is drastically reduced.

FIG. 7 illustrates the exchanges of parameters between task 160, Database object 200 and JDBC™ 170 for the case where task 160 wishes to drop the connection to database 124. Task 160 invokes dbDrop method 250. The dbDrop method 250 relinquishes connection member variable 205, SQL Insert PreparedStatement member variable 215 and SQL Query PreparedStatement member variable 235.

The preceding examples, as illustrated in FIGS. 3 through 8, describe some of the possible applications of Database class 180 and Database object 200. It should be understood that various alternatives and modifications can be devised by those skilled in the art without departing from the invention. For example, Database class 180 may be defined to include methods for updating or deleting data from database 124, or for using more complex SQL features such as the "where" clause. These alternative methods could also utilize JDBC™ PreparedStatements as in the examples.

Although described here in the context of a three-tier computer network, the present invention may be implemented in a two-tier computer network, or on a stand-alone system where the database resides in the same machine as the task seeking access to the database. Further, while the procedures required to execute the invention hereof are indicated as already loaded into the memory of the various computers, they may be configured on a storage media, such as data memory 100, in FIG. 2, for subsequent loading. Accordingly, the present invention is intended to embrace all such alternatives, modifications and variances that fall within the scope of the appended claims.

What is claimed is:

1. A computer-implemented process for accessing a database, said computer including a memory for the storage of data and instructions, said instructions defining
   (i) an application program interface, for interfacing with said database,
   (ii) a task requiring access to said database, and
   (iii) a class comprising data and methods, said data defining variables applying to a plurality of objects, said methods invoked to process said plurality of objects for interfacing between said task and said application program interface,
   said process comprising the steps of:
   (a) creating said task;
   (b) said task thereafter instantiating said class, to create an object of said class, and invoking a first method to make a connection to said database, said first method employing said application program interface and requiring plural handshaking communications with said database, said plural handshaking communications resulting in said database connection being assigned a connection handle enabling subsequent use of said connection, and storing said connection handle;
   (c) for said task and any subtasks within said task, employing said connection handle to enable said subsequent use of said connection without requiring at least some of said plural handshaking communications.

2. The process recited in claim 1, further comprising the steps of said task invoking a second method and passing to said second method a set of input parameters, said second method:
   (d1) formulating a database interface statement based on said set of input parameters;
   (d2) executing a database transaction, employing said database interface statement, via said application program interface; and
   (d3) if said database transaction yields a result, then obtaining a set of output parameters from said second method.

3. The process recited in claim 1, further comprising the steps of said task:
   (d1) invoking a second method and passing to said second method a first set of input parameters, said second method formulating a first database interface statement based on said first set of input parameters, said first database interface statement being stored for repetitive use;
   (d2) invoking a third method and passing to said third method a second set of input parameters, said third method formulating a second database interface statement based on said second set of input parameters and said first database interface statement;
   (d3) executing a database transaction, employing said second database interface statement, via said application program interface; and
   (d4) if said database transaction yields a result, then obtaining a set of output parameters from said third method.

4. The process recited in claim 3, further comprising the steps of repeating said steps (d2), (d3) and (d4) one or more times, wherein said second set of input parameters may be different for each of said one or more times.

5. The process recited in claim 1, wherein said variables include one or more vectors.

6. The process recited in claim 1, wherein one or more of said methods formulate Structured Query Language (SQL) statements.

7. A computer for accessing a database, said computer comprising:
   (a) a memory for storing data and instructions and a processor for executing said instructions;
   (b) said instructions controlling said local processor to:
      (1) create a task requiring access to said database;
      (2) instantiate a class to create an object of said class, said class comprising data and methods, said data defining variables applying to a plurality of objects, said methods invoked to process said plurality of objects for interfacing between said task and an application program interface for interfacing with said database;
      (3) invoke a first method to make a connection to said database, said first method employing said application program interface and requiring plural handshaking communications with said database, said plural handshaking communications resulting in said connection being assigned a connection handle enabling subsequent use of said connection, and storing said connection handle; and
      (4) thereafter, employing said connection handle to enable said subsequent use of said connection without requiring at least some of said plural handshaking communications.

8. The computer of claim 7, wherein said instructions further control said processor to invoke a second method to:
   (a) formulate a database interface statement based on a set of input parameters;
   (b) execute a database transaction, employing said database interface statement, via said application program interface; and
   (c) if said database transaction yields a result, then obtain a set of output parameters.

9. The computer of claim 7, wherein said instructions further control said processor to:
   (a) invoke a second method to formulate a first database interface statement, said first database interface statement based on a first set of input parameters and being stored for repetitive use;
   (b) invoke a third method to formulate a second database interface statement, said second database interface statement based on a second set of input parameters and said first database interface statement;
   (c) execute a database transaction, employing said second database interface statement, via said application program interface; and
   (d) if said database transaction yields a result, then obtain a set of output parameters from said third method.

10. The computer of claim 9, wherein said instructions further control said local processor o invoke said third method and execute a database transaction one or more times, wherein said second set of input parameters may be different for each of said one or more times.

11. The computer of claim 7, wherein said variables include one or more vectors.

12. The computer of claim 7, wherein one or more of said methods formulate Structured Query Language (SQL) statements.

13. A memory media including a program with instructions for controlling a computer to access a database, said computer including a memory for the storage of said instructions, and a processor for executing said instructions, said instructions defining:
   (i) an application program interface, for interfacing with said database,
   (ii) a task requiring access to said database, and
   (iii) a class comprising data and methods, said data defining variables applying to a plurality of objects, said methods invoked to process said plurality of objects for interfacing between said task and said application program interface, said memory media comprising:
      (a) a means for controlling said processor to create said task;
      (b) a means for controlling said processor to instantiate said class to create an object of said class, and thereafter invoking a first method to make a connection to said database, said first method employing said application program interface and requiring plural handshaking communications with said database, said plural handshaking communications resulting in said database connection being assigned a connection handle enabling subsequent use of said connection, and storing said connection handle; and
      (c) a means for controlling said processor to, for said task object and any subtasks within said task object, employ said connection handle to enable said subsequent use of said connection without requiring at least some of said plural handshaking communications.

14. The memory media recited in claim 13, further comprising a means for controlling said processor to invoke a second method to:
   (a) formulate a database interface statement based on a set of input parameters;
   (b) execute a database transaction, employing said database interface statement, via said application program interface; and
   (c) if said database transaction yields a result, then obtain a set of output parameters.

15. The memory media recited in claim 13, further comprising a means for controlling said processor to:
   (a) invoke a second method to formulate a first database interface statement, said first database interface statement based on a first set of input parameters and being stored for repetitive use;
   (b) invoke a third method to formulate a second database interface statement, said second database interface statement based on a second set of input parameters and said first database interface statement;
   (c) execute a database transaction, employing said second database interface statement, via said application program interface;
   (d) if said database transaction yields a result, then obtain a set of output parameters from said third method.

16. The memory media recited in claim 15, further comprising means for controlling said processor to invoke said third method and execute a database transaction one or more times, wherein said second set of input parameters may be different for each of said one or more times.

17. The memory media recited in claim 13, wherein said variables include one or more vectors.

18. The memory media recited in claim 13, wherein one or more of said methods formulate Structured Query Language (SQL) statements.

* * * * *